Feb. 5, 1929.

Re. 17,208

P. R. GLASS

PROCESS OF AND MACHINE FOR PERFORATING

Original Filed Oct. 11, 1919 2 Sheets-Sheet 1

INVENTOR

Perley R. Glass

By his Attorney

Nelson W. Howard

Feb. 5, 1929.

Re. 17,208

P. R. GLASS

PROCESS OF AND MACHINE FOR PERFORATING

Original Filed Oct. 11, 1919 2 Sheets-Sheet 2

INVENTOR

Perley R. Glass

By his Attorney,

Nelson W. Howard

Reissued Feb. 5, 1929. Re. 17,208

UNITED STATES PATENT OFFICE.

PERLEY R. GLASS, OF WAYLAND, MASSACHUSETTS, ASSIGNOR TO UNITED SHOE MACHINERY CORPORATION, OF PATERSON, NEW JERSEY, A CORPORATION OF NEW JERSEY.

PROCESS OF AND MACHINE FOR PERFORATING.

Original No. 1,448,210, dated March 13, 1923, Serial No. 329,997, filed October 11, 1919. Renewed June 14, 1922, Serial No. 568,238. Application for reissue filed July 3, 1924. Serial No. 724,126.

This invention relates to methods of and machines for perforating and is herein set forth by way of illustration with special reference to forming an ornamental row of punch holes or perforations along the margins of pieces of upper leather which are to be used in the manufacture of boots and shoes. According to a usual practice, prior to my invention, stock to be perforated was positioned between a flexible non-metallic backing member, such as a strip of paper, and a punch, the latter being reciprocated to perforate the stock and penetrate the backing strip without coming into contact with whatever support was used behind the backing strip. The paper was fed forward after every punching and there was no attempt to use a transverse dimension of the paper, such as its thickness, by punching a predetermined plurality of times in a given locality prior to the next forward feed movement of the backing strip. While by such practice very satisfactory work might be accomplished, the high cost of the paper backing strip was a considerable item and corresponding disadvantage.

An object of this invention, accordingly, is to reduce the amount of backing material used in performing a given amount of perforating. Considering the invention in its method aspect, I accomplish this by automatically feeding the backing material intermittently not only in the direction of its length but also in another direction transversely to its forward feed movement. Although the transverse feed may, if desired, be widthwise of the strip, I preferably give it a transverse feed in the direction of its thickness thus utilizing the same portion of the non-metallic backing member to receive a perforating instrument, such as a punch, at the conclusion of each of a series of perforating operations, the perforating instrument being so manipulated or controlled as to penetrate the backing strip without passing through it at each of the perforating movements carried out against a given portion of the backing member.

An important feature of my invention in its machine aspect is the provision of a perforating machine in which perforating means is moved relatively to stock positioned against a backing strip, the backing strip and the perforating means being so controlled that at each of a series of perforating movements the perforating means penetrates the same portion of the backing strip without passing entirely therethrough. In the machine which I have illustrated for purposes of exemplification, the punch has a uniform stroke and the backing strip is moved very slightly towards the punch after each of several strokes so as to utilize as nearly as is practicable its entire thickness, and is fed lengthwise only after almost its entire thickness has been so utilized.

Further features of the invention include the provision in such a machine of means for holding the backing strip feeding and controlling mechanism out of operative position, in case it is desired to punch directly against the punch block, without interfering with the operation of the other parts of the machine and in the provision of a work support mounted to be readily moved out of the way when it is desired to operate upon stock of such a shape that the work support is inconvenient.

Another feature of the invention relates to an improved mechanism for operating upon and feeding the work. In the embodiment shown, a stem is mounted to reciprocate in an overhanging arm to cause the punch to perforate the work and the punch is mounted in a slideway of the reciprocating stem to move rearwardly for feeding the work in alinement with the overhanging arm.

These and other aspects of the process of my invention, and features of the machine thereof, including certain details of construction and combinations of parts, will be described in connection with an illustrative machine and pointed out in the appended claims. It is to be distinctly understood, however, that said illustrated machine is to be considered as disclosed for purposes of exemplification and that my invention is not intended to be limited thereto.

Referring to the accompanying drawings in which like reference characters indicate like parts in the several figures,—

Figure 3:
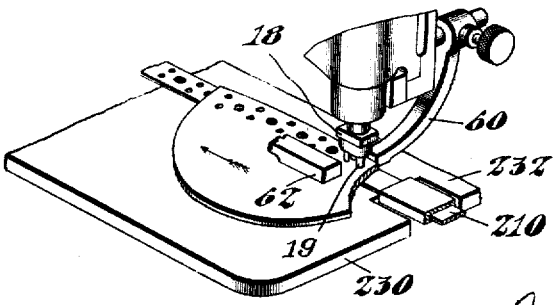
Fig. 3 is a detail view showing the relation of the work to the punch and the backing trip.

The illustrated machine is provided with a main frame 10 in which is suitably journaled a drive shaft 12 provided with a pair of cams 14 and 16 for controlling the work feeding movement and the perforating movement of the perforating tool herein illustrated as a punch 18 having three punch tubes 19 arranged in a triangle as indicated in Fig. 3. Provided with a pair of suitable surfaces engaging cam 16 is a bifurcated lever 20 fulcrumed at 22 to the main frame and pivoted at its upper end to a link 24 connected also with the knuckle 26 of the punch reciprocating toggle 28. The two members of toggle 28 are pivoted at 30 and 32 to the main frame near the outer end of its overhanging arm and to a suitable part, such as sleeve 34, of the punch reciprocating mechanism, respectively. Suitable bearings 36 and 38 are provided in the forwardly extending portion of the main frame to guide the reciprocation of the punch 18 and the parts of the machine which reciprocate therewith. Adjustably connected to the sleeve 34 is a stem 40 provided at its lower end with a groove forming a slideway 42 in which the punch is reciprocated for work feeding movement in a direction at right angles to its perforating movement, as will be hereinafter described. Suitable mechanism may conveniently be provided for adjusting stem 40 with respect to sleeve 34, that shown being substantially in accordance with the disclosure of Patent No. 640,426, granted January 2, 1900, to Charles P. Stanbon, and consisting of a wedge 44 passing through a slot in the stem 40 and adjustable with respect thereto by means of a hand screw 46. Wedge 44 bears also against sleeve 34 with the result that the adjustment of the wedge moves stem 40 relatively to sleeve 34. Stem 40 is provided with a second slot 48 through which passes a pin 50 engaging the upper end of sleeve 34 and adjustably held in contact therewith by spring 52 and a screw 54 threaded into the upper end of stem 40, as clearly shown in cross-section in Fig. 1. It will thus be apparent that the perforating reciprocation and the limit of downward movement of punch 18 can be conveniently adjusted by means of screw 46.

Figure 1:
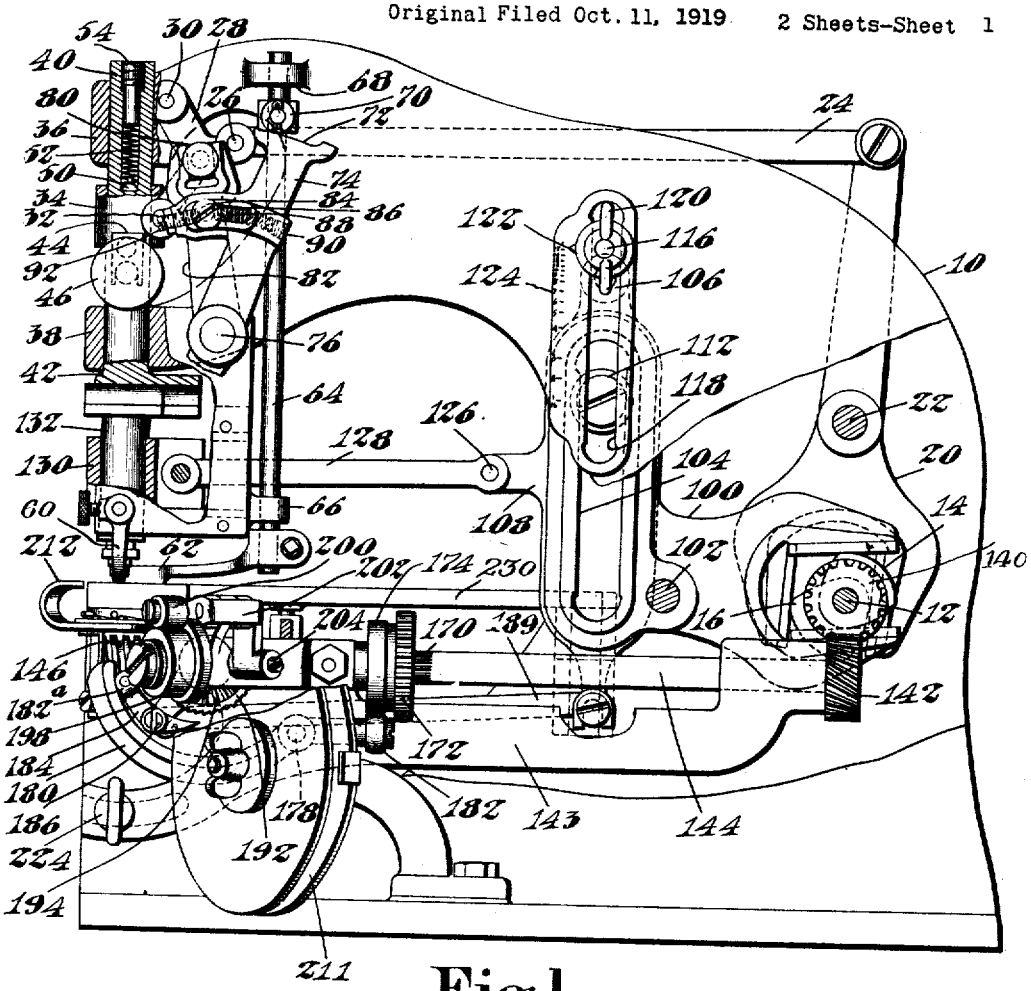
Fig. 1 is a side elevation of the machine with certain parts broken away to show certain details of construction.

Adjustably connected to the main frame of the machine adjacent to the punch 18 is an edge gage 60 and on the side of the punch remote therefrom is shown a presser foot 62 mounted at the lower end of a rod 64 sliding in bearings at 66 and 68 for reciprocating movement on the main frame. Rod 64 is provided at its upper end with a roll 70 engaging a cam surface 72 at the upper end of a lever 74 pivoted at 76 in the main frame and provided at its lower end with a handle 78 by which the presser foot may be raised manually when desired. Slidably engaging a block 80 connected to the knuckle of toggle 28 is a lever 82 fulcrumed also at 76 to the main frame. A screw 84 passes through slot 86 in an arm projecting from lever 74 and is threaded in lever 82. (See Fig. 1.) Bearing against this screw 84 is a spring 88 the thrust at the other end of which is taken up by a screw 90 threaded in lever 74. To adjust the normal position of screw 84 with respect to lever 74, there may conveniently be provided a screw 92. It will thus be seen that the throwing of the toggle 28 will oscillate lever 74 and move cam 72 which is of such a form as periodically to elevate rod 64 to raise the presser foot 62 from work engaging position, the projecting portion of the cam being so arranged that presser foot 62 is held in elevated position while the work feeding movement of punch 18 takes place. As the upper end of lever 74 moves towards the right, as illustrated in Fig. 1, rod 64 and the presser foot move downwardly under the action of gravity.

Figure 6:
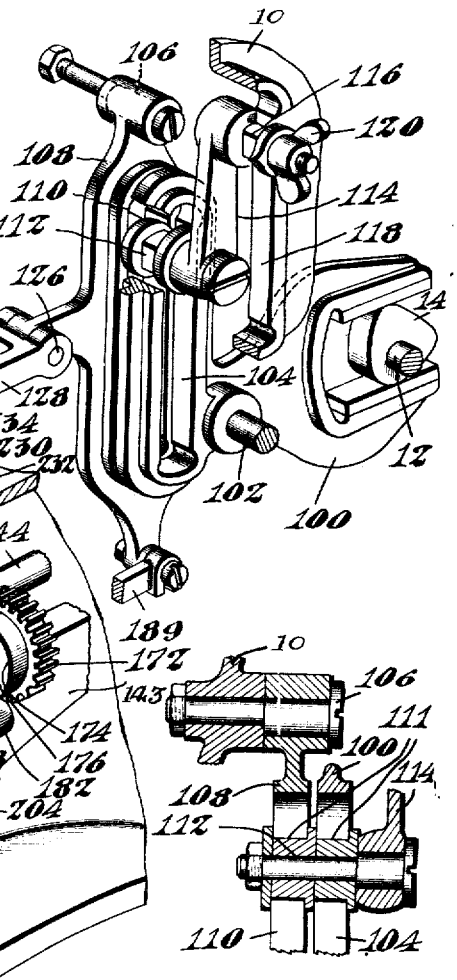
Fig. 6 is a cross-sectional view through the means for adjusting the work feeding movement of the punch.

This work feeding movement of the punch 18 is effected by means of a mechanism comprising a cam 14 on the main drive shaft engaging a bell crank lever 100 pivoted at 102 to the main frame and provided in its upwardly extending arm with a slot 104. Fulcrumed on an eccentric stud 106 (Fig. 6) within the main frame is another lever 108 provided with a slot 110 parallel to slot 104. Passing through slots 104 and 110 and provided with suitable bearing members 111 therein is a pivot 112 carried by a link 114 connected at its upper end to a rod 116 adjustable in a slot 118 in the main frame to which it may be clamped by a wing nut 120. The rod 116 may be conveniently provided with a pointer 122, and adjacent the path of movement of this pointer there is shown a scale 124 to indicate the extent of the work feeding movement of the punch. Pivoted at 126 to lever 108 is a link 128 connected at its other end to a sleeve 130 through which passes a stem 132 guided for horizontal reciprocation at its upper end in the groove formed in the end of the member 40, said stem 132 carrying at its lower end the punch 18. The sleeve 130 is guided for horizontal work feeding reciprocation in a fixed guide on the frame. It will thus be seen that oscillation of bell crank lever 100 will through pin 112 oscillate lever 108 with the resulting reciprocation of link 128 and work feeding reciprocation of the punch. Variation of the position of pivot pin 112 relative to the fulcrums 102 and 106 of levers 100 and 108 will, it is apparent, vary the extent of the work feeding movement of the punch. The work feeding movement is rearwardly away from the operator and in alinement with the overhanging arm of the frame 10.

Figure 4:
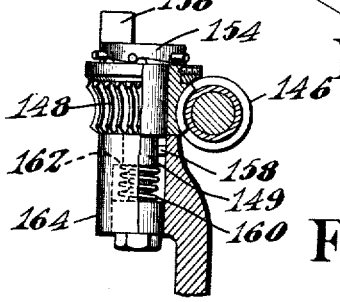
Figs. 4 and 5 are assembled and disassembled views, respectively, of parts of the backing strip controlling mechanism.
Figure 5:
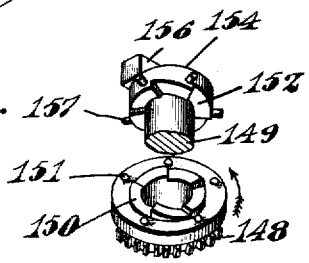

Mounted on shaft 12 is a skew gear 140 engaging a similar gear 142 mounted on shaft 144 carried horizontally in a bracket 143 adjustably connected to the main frame, as will be hereinafter more fully described, and provided at its forward end with a worm 146 meshing with worm wheel 148 rotatably mounetd on a vertically movable stud 149. Formed integral with the upper surface of worm wheel 148 are a series of inclined cam surfaces 150 and a corresponding series of protuberances 151 as clearly shown in Fig. 5, the former engaging a co-operating series of cam surfaces 152 formed on the lower surface of a punch block carrying member or anvil 154, rigid with stud 149 and carrying punch plate or block 156. Extending radially from member 154 is a series of pins 157, corresponding in number and spacing to the protuberances 151. Stud 149 is restrained from rotary movement by means of a pin and slot connection 158 as shown in Fig. 4. Cam surfaces 150 and 152 are conveniently held in contact by spring 160 bearing against a shoulder near the lower end of stud 149 and a cooperatitng shoulder 162 formed in bearing 164 supporting the stud 149 in the main frame. Between its ends shaft 144 is provided with a pinion 170 meshing with spur gear 172 formed rigid with cam 174 and journaled at 176 in an upwardly extending projection of frame member 143. Oscillatable about a pivot 178 is a lever 180 carrying at one end a roll 182 bearing against and moved by cam 174. The other end of lever 180 is curved as clearly shown in Fig. 2 and is provided on its upper surface with a way against which bears a roll 182[a] mounted in the end of a pawl 184 pivoted at 186 to a rocking support 188 carried by bracket 143 and to a link 189 connected at its other end to lever 108 and reciprocated thereby. This pawl is provided with a spring 190 tending to hold it in engagement with a ratchet 192. Rigid with ratchet 192 and supported also by the member 188 is one of a pair of bevel gears 194 and 196, the latter of which is journaled on an extension of bracket member 143 and is formed rigid with a roll 198. A roll 200 is carried by a lever 202 adjustably fulcrumed adjacent to the roll 198 and movable with respect thereto by means of a screw 204 to grip a paper backing strip as will later appear.

Passing over the punch block 156 is a backing member illustrated in Fig. 3 as a strip of paper 210 passing from a grooved strip holder reel 211 (Fig. 1) between rolls 198 and 200 and from them through a hollow guide tube 212 to punching position on the punch block 156.

Figure 2:
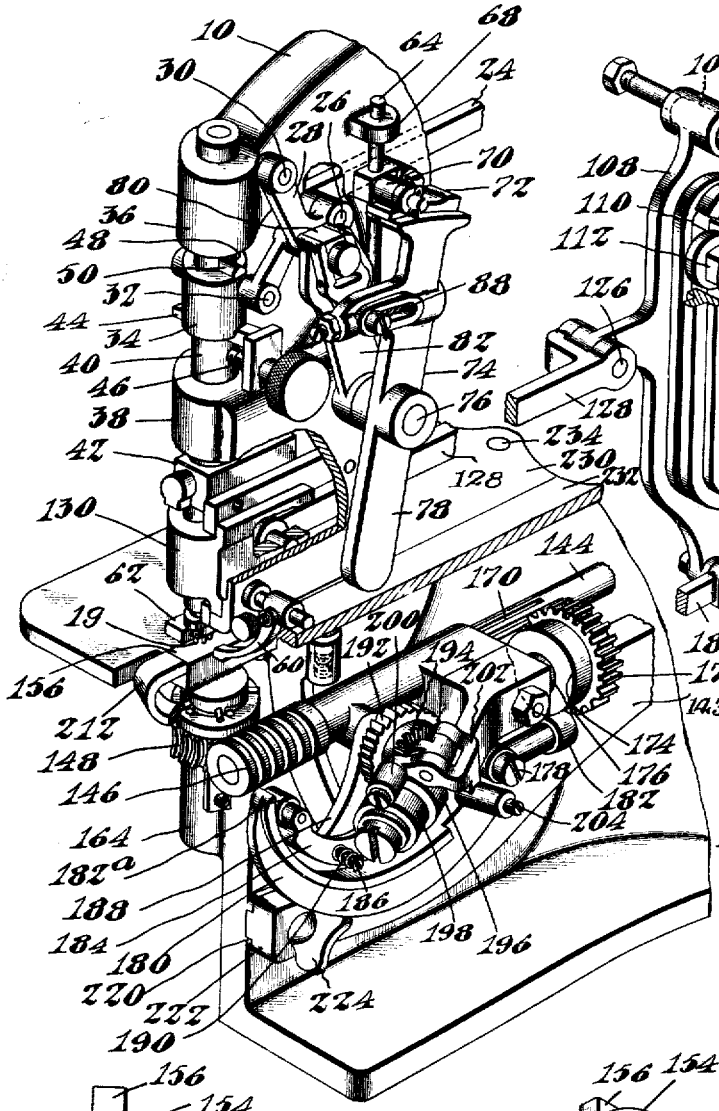
Fig. 2 is a perspective view with certain parts broken away to show more clearly the construction of the machine.

The main frame of the machine is provided with a guideway 220 in which is a co-operating guide member 222 shown at the lower left-hand portion of Fig. 2 and formed on the end of the bracket member 143. Members 220 and 222 may be clamped in adjusted position by means of a hand screw 224. It should be noted here that the backing strip feeding and controlling means is mounted on and supported by bracket member 143 of the frame with the result that said bracekt may be clamped in the operative position shown in the drawings or it may be moved and clamped in such position that gears 142 and 140 are in non-meshing relation on such occasions as it may be desired to use the machine without utilizing the backing strip as, for instance, if it is desired to perform the punching operation directly against a metal or other suitable punch block without the interposition of the backing strip.

The machine may conveniently be provided with a work support shown as a table consisting of two parts 230 and 232 pivoted as indicated at 234 (see Fig. 2) to the main frame and adapted to support the work as indicated in Fig. 3. When, however, it is desired to operate upon work, such as a closed vamp, which can not be conveniently supported on a flat surface, the two parts of the work table may be swung about pivotes 234 away from one another and from the punch.

In operation, the punch descends to perforate the stock and partly to penetrate the backing strip and then is relieved and rises slightly out of the backing strip while still in engagement with the stock. The punch is next moved horizontally to feed the stock. Then moves vertically and thereafter returns horizontally at an upper level to its original position. I will now describe the mode of operation of the feed roll mechanism for controlling the position of and feeding the backing strip. A supply of paper or other backing material is carried by the grooved holder reel 211, passing from there between rolls 198 and 200 and through guide 212 over the punch block 156. Assuming that the punch block is in its lowest position, as indicated in Fig. 4, it will be raised slightly as cam surfaces 150 are rotated. The gearing is so timed, in the mechine illustrated, that the punch block will be raised a distance somewhat less than one-fifth of the thickness of the backing strip between each two punching operations, cam surfaces 150 being moved one twenty-fifth of a revolution, that is one-fifth the length of each cam surface, between consecutive punching operations, until after five punching operations it has been raised a distance almost, but not quite, equal to the thickness of the paper so that if another punching operation were performed against the same portion of the backing strip the punch would come into undesirably close proximity to the punch block. At this time pawl 184 is swung into contact with ratchet 192 through the operation of its spring this being permitted by the lowering of the left-hand end (as viewed in Figs. 1 and 2) of lever 180 and upon the reciprocation of link 189 moves the ratchet a step thus operating roll 198 to feed or push the strip of paper forward preferably just enough to clear the punch holes and present a new backing surface to the punch. While this is taking place, the punch block is held in its elevated position by means of the pins 157 supported by the protuberances 151. Immediately thereafter as cam surfaces 150 are rotated in the direction of the arrow in Fig. 5, stud 149 snaps back into its lowermost position carrying with it, of course, the punch block 156. It will thus be seen that the punch operates in a uniform path to perform the perforating operations and that the punch block and backing strip are moved a short distance towards the punch for each of a series of perforating operations and thereafter the backing strip is moved longitudinally and the punch block is held temporarily elevated, and then the punch block and backing strip are moved downwardly a distance equal to the sum of the preceding upward movements thus leaving the backing strip at its original level ready for a repetition of the foregoing.

Having described my invention, what I claim as new and desire to secure by Letters Patent of the United States is:

1. The process of perforating stock which consists in positioning a portion of stock with the location of a desired perforation against a fibrous backing member, perforating the stock by a suitable instrument and in the same operation penetrating the backing member, reducing the distance between the instrument and the backing member, positioning an unperforated portion of stock against the previously penetrated portion of the backing member and causing the perforating instrument to perforate the stock as before and to penetrate the packing member to a greater depth than in the preceding operation to ensure a clean cut perforation.

2. The process of perforating stock which consists in positioning a portion of stock with the location of a desired perforation against a backing member, operating a perforating tool through a uniform predetermined path so as to perforate the stock and slightly penetrate the backing member, moving the backing member nearer to the instrument, positioning an unperforated portion of stock with the location of a desired perforation against the previously penetrated portion of the backing member, and operating the perforating tool so as to perforate the stock and penetrate the backing member to a greater depth than that of the previous penetration.

3. The process of perforating stock which consists in positioning a portion of stock with the location of a desired perforation against a backing member, perforating the stock by a suitable instrument and at the same operation penetrating, without passing through the backing member, reducing the distance between the instrument and the backing member, positioning another portion of said stock with the location of a desired perforation against the previously penetrated portion of the backing member, and causing the instrument to perforate the stock and penetrate the backing member to a greater depth than in the preceding operation but without passing therethrough.

4. The process of perforating stock which consists in causing a suitable instrument to perforate a piece of stock positioned against a backing strip and penetrate the backing strip, moving the stock a short distance, and operating the perforating instrument so as to penetrate the backing strip in the same place as in the previous operation and to a greater depth but without passing therethrough.

5. The process of perforating stock which consists in performing a series of stock perforating operations against the same portion of a backing member, moving the backing member and causing the perforating instrument at each perforating movement after the first to penetrate the backing member to a slightly greater depth than at its previous perforation to ensure clean cut perforations.

6. The process of perforating stock which consists in positioning a piece of stock with the location of a desired perforation against the backing strip and alternately perforating the stock with a suitable instrument and moving the piece of stock a step forward so as to produce a row of perforations therein, the instrument at each perforating movement penetrating the backing strip to a slightly greater depth than at its previous perforation.

7. The process of perforating stock which consists in sequentially positioning portions of a piece of stock between and in operative relation to a backing member and a perforating instrument, and causing a series of relative movements of the backing member and the perforating instrument to form the desired perforations, the relative movements being such that at the first movement of a series the perforating instrument penetrates the backing member, and at each movement after the first of said series the tool penetrates the backing member to a depth greater than it penetrated at the preceding movement.

8. The process of perforating stock which consists in sequentially positioning portions of stock with the locations of desired perforations in the stock between and in operative relation to a backing member and a perforating instrument, causing a series of relative movements of the backing member and the perforating instrument to form the desired perforations, the relative movements being such that at the first movement of a series the perforating instrument penetrates the backing member, and at each movement after the first of said series the perforating instrument penetrates the backing member to a depth greater than that to which it penetrated at the preceding movement, and moving the backing member a step transversely to the direction of said relative movements after each of said series of relative movements.

9. The process of perforating stock which consists in positioning a piece of stock with the location of a desired perforation against a backing strip, repeatedly operating a perforating instrument through a uniform predetermined path so as to perforate the stock, moving the stock a step forward between successive perforating operations, and moving the backing member a short distance toward the perforating tool between successive perforating operations.

10. The process of perforating stock which consists in positioning a piece of stock with the location of a desired perforation against a backing strip, repeatedly operating a perforating instrument through a uniform path so as repeatedly to perforate the stock, moving the stock a step forward between successive perforating operations, moving the backing strip a short distance toward the perforating instrument after each of a series of perforating operations, and moving the backing strip after the last perforating operation of the series a step longitudinally and a distance away from the perforating tool equal to the sum of its movement toward the tool, thus leaving the backing strip in position for a repetition of the foregoing.

11. The process of perforating stock which consists in positioning a piece of stock with the location of a desired perforation against a backing strip, repeatedly operating a perforating instrument through a uniform path so as repeatedly to perforate the stock, moving the stock a step forward between successive perforating operations, moving the backing strip a short distance toward the perforating instrument after each of a series of perforating operations, holding the backing strip in its position nearest to the perforating instrument while moving the backing strip a step longitudinally, and then moving the backing strip a distance away from the perforating tool equal to the sum of its movement toward the tool, thus leaving the backing strip in position for a repetition of the foregoing.

12. In a perforating machine, the combination of a punch, a punch block, a backing strip supported by the punch block, means for causing the punch to perforate the work and partly penetrate the backing strip, and means for moving the punch block and the strip in the direction of the punch to utilize the thickness of the strip as a backing for a series of perforating movements of the punch.

13. In a perforating machine, the combination of a punch, a punch block, a backing strip supported by the punch block, means for operating the punch to perforate the work and partly penetrate the backing strip, means for moving the punch block and the strip in the direction of the punch to utilize the thickness of the strip as a backing for a series of perforating movements of the punch, means for returning the punch block to its original position after the series of perforating movements of the punch, and means for moving the backing strip across the punch block in readiness for a new series of perforating movements.

14. In a perforating machine, the combination of a punch, a punch block, a backing strip supported by the punch block, means for operating the punch, and automatic means for reducing the distance between the punch block and the punch during a series of reciprocating movements of the punch to utilize the thickness of the strip as a backing.

15. In a perforating machine, the combination of a punch, a punch block, a backing strip supported by the punch block, means for operating the punch, automatic means for reducing the distance between the punch block and the punch during a series of reciprocating movements of the punch to utilize the thickness of the strip as a backing, and means for moving the backing strip across the punch block for a new series of perforating movements of the punch.

16. In a perforating machine, the combination of a punch, a punch block having a backing strip, means for operating the punch, and means, operable during a series of operating movements of the punch, for moving the backing strip towards the punch a total distance less than the thickness of the backing strip to utilize the thickness of the backing strip.

17. In a perforating machine, the combination of a punch, a punch block, a backing strip supported by the punch block, means for operating the punch, means, operable during a series of operating movements of the punch, for moving the backing strip toward the punch a total distance less than the thickness of the backing strip, and means for feeding the backing strip across the punch block after each series of operating movements of the punch.

18. In a perforating machine, the combination of a perforating tool constructed and arranged to operate against a backing member, and automatic means for reducing the distance between the backing member and the perforating tool during a series of operating movements of the perforating tool to utilize the thickness of the backing member.

19. In a perforating machine, the combination of a backing strip, a perforating tool constructed and arranged to operate against the backing strip, means for operating the perforating tool, and means for moving the backing member towards the perforating tool during a series of operating movements of the perforating tool to utilize the thickness of the backing member.

20. In a perforating machine, the combination of a punch, a punch block, a backing strip, means for feeding the backing strip step-by-step over the punch block, and means for operating the punch and punch block to perform a series of successive punching operations without feeding movement of the backing strip after each step of the feeding movement of the backing strip.

21. In a perforating machine, the combination of a punch, a backing strip, automatic means for feeding the backing strip step-by-step, and means for operating the punch to perform a series of successive punching operations against the same portion of the backing strip after each step of the feed thereof.

22. In a perforating machine, the combination of a perforating tool, a backing member against which the perforating tool operates, and means for operating said tool and for moving the backing member towards the tool during a series of perforating operations a distance less than the thickness of the backing member to utilize the thickness of the backing member.

23. In a perforating machine, the combination of a perforating tool for performing a series of perforating movements, a backing member against which the perforating tool operates, and power-operated means for moving the backing member a short distance towards the tool during each perforating movement of the tool, the total movement of the backing member during the series of movements of the tool being insufficient to cause the tool to pass through the backing member.

24. In a perforating machine, the combination of a punch constructed and arranged to operate against a backing strip, a backing strip, feeding means to move relatively the punch and backing strip step-by-step, means to cause a series of relative stock perforating and backing strip penetrating movements of the punch and backing strip after each step of the relative feeding movement of the punch and backing strip, and means to cause the punch to penetrate the backing strip to a slightly greater depth at each successive movement of the series.

25. In a perforating machine, the combination of a punch, a punch block, a backing member supported on the punch block, means for moving the punch block in the direction of the punch to utilize the thickness of the backing member for a series of punching operations, and means thereafter to move the punch block away from the punch a distance equal to the first movement.

26. In a perforating machine, the combination of a punch, a punch block, a backing strip, means for moving the punch block in the direction of the punch to utilize the thickness of the backing member for a series of punching operations, means thereafter to move the punch block away from the punch to its original position, and means for feeding the backing strip over the punch block in readiness for a new series of punching operations.

27. In a perforating machine, the combination of a backing strip, a punch constructed and arranged to operate against the backing strip, means to feed the strip forward step-by-step, and automatic means to move the strip transversely to the direction of its forward movement.

28. In a perforating machine, the combination of a backing member, a perforating tool arranged to operate against the backing member, means to move the tool towards and from the backing member for a series of stock perforating operations, and means, operable automatically during the series of stock perforating operations, to move the backing member towards the tool to utilize the thickness of the backing member.

29. In a perforating machine, the combination of a backing member, a perforating tool constructed and arranged to operate against the backing member, and automatic means to move the backing member a short distance towards the tool for every successive perforating operation to utilize the thickness of the backing member for a series of perforating operations.

30. In a perforating machine, the combination of a backing member, a perforating tool constructed and arranged to operate against the backing member, means to produce a series of equal successive perforating movements of said tool, and means automatically to decrease the distance between said tool and said backing member between consecutive pairs of a series of successive perforating movements.

31. In a perforating machine, the combination of a backing strip, a punch constructed and arranged to operate against the backing strip, means to cause a number of series of relative stock perforating and backing strip penetrating movements of the punch and backing strip, and means, under the control of the machine, to feed the strip a step forward after each series of stock perforating and backing strip penetrating movements.

32. In a perforating machine, the combination of a backing strip, a punch constructed and arranged to operate against the backing strip, means to feed the strip forward step-by-step, means to cause a series of relative stock perforating and backing strip penetrating movements of the punch and backing strip between successive feeding movements of the strip, and means to cause the punch to penetrate the backing strip to a slightly greater depth at each successive movement of a series.

33. In a perforating machine, the combination of a backing strip, a punch constructed and arranged to operate against the backing strip, means to move the backing strip a short distance towards the punch for each of a series of punching operations, and means to move the strip a step forward and to its original distance from the punch after the last punching operation of said series.

34. In a step-by-step perforating machine, the combination of a backing member, a punch operating against the backing member, power-operated means to move the backing member step-by-step transversely to the direction of punching movement of the punch, and means to operate the punch to perform a series of perforating operations on a piece of stock between said step-by-step movements.

35. In a step-by-step perforating machine, the combination of a backing member, a perforating tool operating against the backing member, means constructed and arranged to operate the perforating tool to perform a succession of series of perforating operations on a piece of stock, all the perforating operations of the tool in each series being directed against the same portion of the backing member, and means operating automatically to move the backing member between the successive series.

36. In a perforating machine, the combination of a punch, a backing strip, means constructed and arranged to operate said punch against the backing strip, mechanism to feed and control the position of the backing strip, a bracket for supporting said mechanism, and means for holding said bracket with its mechanism out of operative position and at the same time leaving said punch operating means in operative condition.

37. In a perforating machine, the combination of a punch, a punch block, a backing strip, means for feeding the backing strip over the punch block, and a cam for moving the punch block and the backing strip in the direction of the punch to ensure clean cut perforations.

38. In a perforating machine, the combination of a perforating tool constructed and arranged to operate against a backing member, a punch block supporting the backing member and having a cam surface formed thereon, a cam member engaging said cam surface, and mechanism for rotating said cam member and moving the punch block to utilize the thickness of the backing strip for a series of punching operations.

39. In a perforating machine, the combination of a punch, a punch block, means for feeding a backing strip thereover, a cam member operatively connected to the punch block, a second cam member having a form complemental to the first and co-operating therewith, and means to rotate one of said cam members to transmit a rectilinear movement to said punch block.

40. In a perforating machine, the combination of a punch, a punch block, a pair of opposing rolls for feeding a backing strip therebetween and over the punch block, and a rotatable cam member for moving the punch block in the direction of the punch.

41. In a perforating machine, the combination of a perforating tool constructed and arranged to operate against a backing strip, a pair of opposed rolls, means for intermittently actuating one of said rolls to feed the backing member forward and past the perforating position of said tool, a cam constructed and arranged to move the backing member toward the tool after each movement of the backing member past the tool, and means to operate the perforating tool after each movement of the backing member.

42. In a perforating machine, a shaft having a cam member and a punch block rigidly connected thereto, means to restrain the shaft against rotary movement but permit longitudinal movement thereof, a second cam member co-operating with the first, and means for rotating said second cam member to transmit longitudinal movement through said first cam member and said shaft to the punch block.

43. In a perforating machine, a shaft having a cam member and a punch block operatively connected thereto, means for restraining the punch block against rotary movement, a second cam member co-operating with the first, and means to rotate one of said cam members to transmit a rectilinear movement to said punch block.

44. In a perforating machine, a shaft having a cam member and a punch block operatively connected thereto, means for restraining the punch block against rotary movement, a second cam member co-operating with the first, means to rotate one of said cam members to transmit a rectilinear movement to said punch block, and means operative after a rectilinear movement to feed a backing strip a step forward over said punch block.

45. In a perforating machine, a shaft having a cam member and a punch block operatively connected thereto, means for restraining the punch block against rotary movement, a second cam member co-operating with the first, means to rotate one of said cam members to transmit a rectilinear movement to said punch block, and means operative after a rectilinear movement to feed a backing strip a step forward over said punch block and to return said punch block to its original position.

46. In a perforating machine, a lever provided with a slot, means for uniformly oscillating said lever, a second lever provided with a slot having its length in the same general direction as that of the slot in the first lever, a member passing through said slots and bearing against the walls thereof, means for supporting said member adjustably to vary the amplitude of the oscillations transmitted thereby from the first lever to the second, a link connected to said second lever, and a punch connected to said link for reciprocation thereby.

47. In a machine of the class described, a lever provided with a slot, means for oscillating said lever, a second lever provided with a slot having its length in the same general direction as that of the slot in the first lever, a member passing through said slots and bearing against the walls thereof, means for supporting said member adjustably to vary the amplitude of the oscillation transmitted thereby from the first lever to the second, a sleeve connected to said second lever for horizontal reciprocation, and a tool carrying stem guided by said sleeve for vertical reciprocation.

48. In a machine of the class described, the combination of a perforating tool, a punch block against which the tool operates, and a work table to support the work in operative relation to the tool constructed and arranged to be moved into and out of work supporting position.

49. In a machine of the class described, the combination of an operating tool, and a divided work table to support the work in operative relation to the tool, the parts of said divided work table being severally pivoted to be swung simultaneously into and out of work supporting position.

50. In a machine of the class described, the combination of an operating tool, and a divided work table, the parts of said table being severally pivoted to a support distant from said tool and constructed and arranged to swing from a meeting work-supporting position to a separated out-of-the-way position.

51. In a perforating machine, an overhanging arm, a member mounted for reciprocating movement in the arm and having a lateral groove at the end forming a slideway therein parallel to the overhanging arm, an operating member mounted for lateral feeding movement in the slideway, and means for sliding the operating member to feed the work in alinement with the arm.

52. In a perforating machine, a frame having alined bearings, a stem mounted for reciprocating movement in the bearings, a sleeve mounted for reciprocation in a fixed guide on the frame, an operating member mounted to slide in the sleeve to engage the work and to slide with the sleeve for feeding movement of the work, connections between the stem and the operating member to allow feeding movement of the latter, and means for reciprocating the stem and the operating member to treat the work.

53. In a perforating machine, a member mounted for reciprocating movement and having a lateral slideway therein, an operating member mounted for lateral feeding movement in the slideway, a sleeve surrounding the operating member to guide it for work-engaging movement with respect to said sleeve, and means for moving the sleeve to impart feeding movement to the operating member.

54. In a perforating machine, a frame, an operating member mounted for reciprocation in the frame, toggle mechanism for actuating the operating member to treat the work, a presser foot, and connections from the toggle mechanism to the presser foot for moving the latter away from the work when the operating member is actuated.

55. In a perforating machine, a frame, an operating member mounted for reciprocation in the frame, toggle mechanism for actuating the operating member to treat the work, a presser foot, a cam member to control the presser foot, and connections between the toggle mechanism and the cam member to actuate the presser foot.

56. In a perforating machine, a stem mounted for reciprocation and having a horizontal slideway therein extending from front to rear, mechanism for reciprocating the stem, a perforating tool mounted for horizontal feeding movement in the slideway, and means for sliding the perforating tool to feed the work rearwardly away from the operator.

57. In a machine of the class described, a slidable stem, a frame having bearings for guiding said stem, a fixed guideway arranged transversely to said stem, a sleeve mounted to slide along said guideway for work feeding movement, an operating member constructed and arranged to slide within said sleeve for work engaging movement, means for sliding the stem, and a connection between said stem and said operating member constructed and arranged to impart work engaging movement to said operating member and allow work feeding movement transversely of the stem.

58. In a machine of the class described, in combination, a backing strip, a perforating tool, means for operating the tool to perforate a piece of stock and to penetrate, without passing through, the backing strip, automatic means for feeding the backing strip step-by-step in the direction of its length to utilize the length of the strip, and means controlled by the machine for feeding the backing strip in a direction at right angles to its forward feed movement to use up the strip in another dimension.

59. In a step-by-step perforating machine, a backing strip, a perforating tool, means for actuating the tool to perforate a piece of stock and to penetrate, without passing through, the backing strip, means for actuating the tool in another direction to feed the stock step-by-step over the backing strip, means for feeding the backing strip step-by-step in the direction of its length to utilize the length of the strip, and automatic means for feeding the backing strip in a direction transverse to its forward feed movement to use up the strip in another dimension.

60. In a step-by-step perforating machine, a work support, an arm overhanging the work support, a work feeding punch, and means for reciprocating the punch in a direction parallel to the overhanging arm to feed the work in alinement with said arm.

61. In a perforating machine, in combination, a punch, a movable punch plate, a backing strip extending across and adapted to be fed over said punch plate, means for actuating the punch to punch and feed the work, and means operating in timed relation to the punch movements for raising the punch plate to maintain the backing strip in its elevated position during the feeding movement of the strip.

62. In a perforating machine, a movable punch plate, a work feeding punch, an elongated backing strip adapted to be fed across said punch plate, means for causing the punch to recede from the backing strip preparatory to feeding the work, and means for holding the punch plate in elevated position during the feeding movement of the backing strip.

63. In a perforating machine, a punch, a punch plate, a backing strip, means for actuating the punch to punch and feed the work constructed and arranged to effect a relief movement of the punch prior to its feed movement, and means controlled by the machine for elevating the punch plate in a direction opposite to the relief movement of the punch.

64. In a perforating machine, in combination, a punch plate, a backing strip extending over said punch plate, a punch, means for actuating the punch to feed the work step-by-step, and means for raising the punch plate and holding it in its highest position during certain periodically recurrent feeding movements of the punch.

65. In a perforating machine, in combination, a backing strip, a punch, a co-operating punch plate beneath the backing strip, means for actuating the punch to feed the work step-by-step, and means for intermittently raising said punch plate through a range less than the thickness of the backing strip and holding it there during the work feeding movement of the punch with less frequency than the step-by-step feed of the work.

66. In a perforating machine in combination, a work feeding punch, a punch plate, a backing strip extending across the punch plate, means for causing relative movement of approach between the punch and punch plate to perforate the work and penetrate the backing strip, means for causing a relative relief movement of the punch and punch plate to allow the punch to leave the backing strip and feed the work, and means for intermittently holding the punch plate in elevated position during the feeding movement of the punch.

67. In a perforating machine, in combination, a punch plate, a backing strip leading over said punch plate, a work feeding punch, means for actuating the punch to perforate the work and to penetrate without passing through the backing strip, means for removing the punch from the backing strip preparatory to feeding the work, and means for intermittently raising the punch plate through a range less than the thickness of the backing strip and holding it in its position of greatest elevation during the strip feeding movement.

68. In a perforating machine, in combination, a punch plate, a backing strip leading over said punch plate, a work feeding punch, means for actuating the punch to perforate the work and to penetrate without passing through the backing strip, means for removing the punch from the backing strip preparatory to feeding the work, and means for intermittently raising the punch block and the backing strip.

69. In a perforating machine, a work feeding punch, an anvil, a punch plate normally supported by the anvil, a backing strip extending across and adapted to be fed over said punch plate, and means for raising said punch plate and backing strip operating automatically at the time of a work feeding movement of the punch.

70. In a perforating machine, the combination of a backing strip beneath a piece of work, a punch, means for actuating the punch to feed the work across the backing strip step by step after each punching operation, means for varying the elevation of the backing strip, and means for causing a strip feeding movement after a predetermined plurality of punching operations with the strip always at a predetermined elevation during said feeding movement.

71. In a perforating machine, the combination of a backing strip, a perforating tool constructed and arranged to operate against the backing strip, means for operating the perforating tool, means for moving the backing strip towards the perforating tool during a series of operating movements of the perforating tool to utilize the thickness of the backing strip, and means for causing a strip feeding movement after said series of operating movements while the backing strip is at its closest approach to the tool.

72. In a perforating machine, the combination of a punch, a punch block having a backing strip adapted to support a piece of work, means for operating the punch to perforate the work and enter the strip without passing through it, means for causing said punch intermittently to effect a feeding movement of the work in a direction transverse to the direction of punching movement, and means acting at greater intervals than the work feeding movement constructed and arranged to elevate the punch block and to hold it there during the feeding movement.

73. In a perforating machine, the combination of a punch, a punch block having a backing strip, means for operating the punch, means, operable during a series of operating movements of the punch, for moving the backing strip towards the punch a total distance less than the thickness of the backing strip to utilize the thickness of the backing strip, and means for feeding the backing strip in a direction transverse to the direction of punching movement.

74. In a perforating machine, the combination of a punch, a punch block, a backing strip to cushion said punch passing over the punch block, means for actuating said punch to perforate the work and moving the same laterally to feed the work, frictional means tending to advance the strip, and means for intermittently raising said punch block and holding it raised during a feeding movement of the backing strip, said machine being constructed and arranged so that the distance of feeding movement of the work is materially greater than the distance of ultimate feed of the backing strip.

75. In a perforating machine, a punch, a punch block, a backing strip passing over said punch block, means for reciprocating said punch to perforate the work, means for moving said punch laterally to feed the work, and means for automatically elevating and lowering said punch block and holding it at its highest position during the feeding movement of the backing strip.

76. In a perforating machine, a punch, a punch block, a backing strip passing over said punch block, feeding rolls for said backing strip, means for intermittently actuating said feeding rolls, means for actuating said punch up and down to perforate the work and penetrate the backing strip, means for moving said punch laterally intermittently, and means for gradually raising said punch block and holding it elevated during the feeding movement of the backing strip.

77. In a perforating machine, a punch, a punch block, a backing strip passing over said punch block, feeding rolls for said backing strip, means for actuating said punch up and down to perforate the work and penetrate the backing strip, means for moving said punch laterally intermittently, and means for intermittently actuating the feeding rolls frictionally to feed the strip and holding the strip at a level higher than normal during the feeding movement of the feeding rolls.

78. In a perforating machine, a work feeding punch, a punch block, a backing strip passing over said punch block, means for moving the punch block to various elevated positions, means for actuating the punch to perforate the work and penetrate the backing strip, and means for intermittently advancing said backing strip over the punch block comprising feed rolls for frictionally engaging the backing strip and means acting in synchronism with the action of said feed rolls for holding the punch block in one of its elevated positions.

79. In a perforated machine, a work feeding punch, a punch block, a backing strip passing over said punch block, means for actuating the punch to perforate the work and penetrate the backing strip, means for intermittently advancing said backing strip over the punch block after a series of work punching movements comprising feed rolls for frictionally engaging the backing strip, and means for controlling the vertical position of the punch block in synchronism with the action of said feed rolls.

80. In a perforating machine, the combination of a punch, a movable punch plate, a backing strip adapted to be fed across said punch plate, means for actuating the punch to punch and feed the work, means for gradually raising the punch plate in order to utilize the full thickness of the backing strip, and means actuated after a series of punching movements to hold the punch plate in elevated position during the feeding movement of the backing strip.

81. In a perforating machine, a movable punch plate, a backing strip extending across and adapted to be fed over said punch plate, strip handling mechanism comprising means for feeding the backing strip intermittently and means operating in timed relation to the strip feeding movements for gradually and intermittently raising the punch plate to utilize the full thickness of the backing strip, said means being constructed and arranged to hold the backing strip in its elevated position during the feeding movements thereof.

In testimony whereof I have signed my name to this specification.

PERLEY R. GLASS.

CERTIFICATE OF CORRECTION.

Reissue Patent No. 17,208. Granted February 5, 1929, to

PERLEY R. GLASS.

It is hereby certified that error appears in the printed specification of the above numbered patent requiring correction as follows: Page 4, line 51, claim 1, for the word "packing" read "backing"; page 10, line 93, claim 79, for the word "perforated" read "perforating"; and that the said Letters Patent should be read with these corrections therein that the same may conform to the record of the case in the Patent Office.

Signed and sealed this 15th day of October, A. D. 1929.

M. J. Moore,
Acting Commissioner of Patents.

(Seal)